(12) United States Patent
Wong et al.

(10) Patent No.: US 11,422,304 B2
(45) Date of Patent: Aug. 23, 2022

(54) OPTICAL INTERPOSER FOR OPTICAL TRANSCEIVER

(71) Applicant: Cloud Light Technology Limited, Hong Kong (HK)

(72) Inventors: Chi Yan Wong, Hong Kong (HK); Yuk Nga Chen, Hong Kong (HK); Vivian Wei Ma, Hong Kong (HK)

(73) Assignee: Cloud Light Technology Limited, Hong Kong (HK)

( * ) Notice: Subject to any disclaimer, the term of this patent is extended or adjusted under 35 U.S.C. 154(b) by 0 days.

(21) Appl. No.: 17/200,937

(22) Filed: Mar. 15, 2021

(65) Prior Publication Data

US 2021/0294033 A1 Sep. 23, 2021

Related U.S. Application Data

(60) Provisional application No. 62/990,988, filed on Mar. 17, 2020.

(51) Int. Cl.
| | |
|---|---|
| *G02B 6/12* | (2006.01) |
| *G02B 6/42* | (2006.01) |
| *G02B 6/122* | (2006.01) |
| *G02B 6/126* | (2006.01) |

(52) U.S. Cl.
CPC ....... *G02B 6/1225* (2013.01); *G02B 6/12004* (2013.01); *G02B 6/126* (2013.01); *G02B 6/4246* (2013.01); *G02B 2006/1213* (2013.01); *G02B 2006/12116* (2013.01)

(58) Field of Classification Search
CPC ............................. G02B 6/126; G02B 6/4246
See application file for complete search history.

(56) References Cited

U.S. PATENT DOCUMENTS

| | | | | |
|---|---|---|---|---|
| 9,989,700 | B1 * | 6/2018 | Ayliffe | G02B 6/4246 |
| 2011/0278441 | A1 * | 11/2011 | Vermeulen | G02B 6/4246 250/200 |
| 2017/0207600 | A1 * | 7/2017 | Klamkin | H01S 5/1032 |
| 2019/0115995 | A1 * | 4/2019 | Sahni | H04B 10/40 |

* cited by examiner

*Primary Examiner* — Charlie Y Peng

(57) ABSTRACT

An optical interposer for providing optimal optical coupling between an optical transceiver interface and an external optical interface includes an interposer photonic integrated circuit (PIC) operably configured to couple an optical signal between the optical transceiver interface and the external optical interface, one or more waveguide based optical devices operably integrated on a common substrate and one or more of interposer input/output (I/O) channels operably configured with the optical transceiver interface and the external optical interface.

18 Claims, 15 Drawing Sheets

OPTICAL INTERPOSER FOR OPTICAL TRANSCEIVER

CROSS-REFERENCE TO RELATED APPLICATIONS

This application claims the benefit of U.S. provisional application No. 62/990,988 titled "Optical Interposer for Optical Transceiver" filed by the applicant on Mar. 17, 2020, which is incorporated herein by reference in its entirety.

FIELD OF THE INVENTION

Embodiments of the present invention relate to a field of photonic integrated systems for an optical transceiver or an optical sensor integrated system. And more particularly, relates to integration of photonic integrated systems for serving multiple functions in the photonic integrated circuit using CMOS fabrication technology.

BACKGROUND OF THE INVENTION

Fast-growing cloud computing and artificial intelligent applications are driving the internet tech giants to build powerful data centers. Building mega data centers are, by far, more cost effective and less complicated than building a number of moderate size data centers for scaling up processing power. However, for transmitting huge volumes of data at ultra-high speed among server nodes/racks in data centers requires high transmission bandwidth. Traditionally, the interconnect is implemented by using copper cables and electrical transceivers for transmitting and receiving data in the form of electrical signals. Such an electrical solution is very bulky, and the transmission distance is less than 20 meters (m) at data rate of 10 Gigabits per second (Gbps).

The optical interposer is a photonic integrated circuit (PIC) that includes one or multiple waveguide-based optical devices integrated on a common substrate, typically a semiconductor substrate. The interposer PIC serves to couple the optical signal between the optical transceiver interface, such as a PIC waveguide, and an external optical interface, such as an optical fiber, an optical fiber array, a planar lightwave circuit (PLC), or free space optical system.

Given that optical solutions have clear advantages in having smaller footprints and longer transmission distance of up to 300 m at 50 Gbps, optical-fibers networks have taken the place of copper-based networks over the years. Conventional optical transceivers in data centers are mostly multimode fiber (MMF). Typical multimode fiber links have data rates of 10 Megabits per second (Mbps) to 10 Gbps over link lengths of up to only 600 m. However, it is not uncommon that the interconnects of nodes in today's Mega data centers readily exceed a distance of 500 m to 2 km. As a result, single mode transceivers for single-mode light transmission are in great demand to connect optical fibers between the nodes. Conventional single-mode transceivers are made of a number of high cost discrete optical components. They have a large footprint and require high cost assembly process and maintenance.

With the emergence of Silicon Photonics (SiPh) technology, a possibility of low cost and small footprint solution for high volume implementation of interconnects exceeding 500 m to 2 km has increased. SiPh technology applies the state-of-the-art complementary metal-oxide-semiconductor (CMOS) foundry process to fabricate photonic integrated circuit (PIC) devices with most of the optical components integrated onto a single silicon chip. However, the optical mode size (the spot size of the light in waveguide) of SiPh chip (also known as Si PIC) input/output (I/O) port is in the order of 1 µm while single mode fiber (SMF) is about 10 µm. Such a large difference in mode size introduces large optical power loss in butt coupling (head-to-head coupling between Si PIC I/O port and SMF). The optical power loss of conventional coupling methods from PIC to optical fiber, PLC (planar lightwave circuit) and edge emitting laser diode, is quite high (more than 50%).

The major reason is that the optical mode size of a waveguide in a PIC is much smaller than that of an optical fiber, PLC and laser diode. Traditional coupling methods use discrete free space optical components such as micro-sized lenses to convert the mode size. This high cost approach is not a viable solution to this problem. Unless this coupling problem is solved, SiPh technology would not be the solution for high volume implementation of SMF interconnects.

Thus, the present invention is aimed to provide an optical interposer the optical interposer for optimal optical coupling of an optical transceiver interface and an external optical interface to overcome the above-discussed drawbacks of the prior arts.

SUMMARY OF THE INVENTION

The foregoing objectives of the present invention are attained by employing an optical interposer couple the optical signal between the optical transceiver interface and an external optical interface. In particular, the optical interposer includes an interposer photonic integrated circuit (PIC) operably configured/adapted to couple the optical signal between the optical transceiver interface and the external optical interface, one or more waveguide based optical devices operably integrated on a common substrate and one or more of interposer input/output (I/O) channels operably configured/adapted with a transceiver PIC input/output (I/O) channel of the optical transceiver interface and the external optical interface.

In accordance with an embodiment of the present invention, the optical transceiver interface is a transceiver photonic integrated circuit (PIC).

In accordance with an embodiment of the present invention, the common substrate is a semiconductor substrate.

In accordance with an embodiment of the present invention, the external optical interface is anyone of an optical fiber, an optical fiber array, a planar lightwave circuit (PLC), a free space optical system and alike.

In accordance with an embodiment of the present invention, the optical interposer is positioned between the transceiver photonic integrated circuit (PIC) and the external optical interface.

In accordance with an embodiment of the present invention, the optical interposer is operably functional as a semiconductor chip.

In accordance with an embodiment of the present invention, the optical interposer is operably functional as a mode size converter between a transceiver PIC input/output (I/O) channel and the external optical interface.

In accordance with an embodiment of the present invention, the optical interposer is operably functional as a polarization selector and/or a polarization switch.

In accordance with an embodiment of the present invention, the optical interposer is operably functional as a polarization rotator.

In accordance with an embodiment of the present invention, the optical interposer is operably functional as a routing circuit to distribute a pitch.

In accordance with an embodiment of the present invention, the optical interposer is operably functional as a polarization splitter.

In accordance with an embodiment of the present invention, the optical interposer is operably functional as an optical multiplexer (MUX) and/or an optical demultiplexer (deMUX).

In accordance with an embodiment of the present invention, the optical multiplexer (MUX) is operably configured/adapted to accept a one or more of optical signals from the transceiver photonic integrated circuit (PIC), multiplexes one or more of optical signals into a single signal.

In accordance with an embodiment of the present invention, the optical demultiplexer (deMUX) receives the single signal from the external optical interface and demultiplex the single signal into one or more of signals.

In accordance with an embodiment of the present invention, the optical interposer further includes an angled interposer interface.

In accordance with an embodiment of the present invention, the optical interposer further includes an angled interposer waveguide.

In accordance with an embodiment of the present invention, a refractive index value of an interposer waveguide is between a transceiver photonic integrated circuit waveguide value and an external optical interface waveguide value.

In accordance with an embodiment of the present invention, the optical interposer is connected to a one or more external optical interface.

In accordance with an embodiment of the present invention, the optical interposer is operably configured/adapted to provide the optimal optical coupling (and/or optical connection) to a one or more of transceiver PIC input/output channels and a one or more of external optical channels.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

ELEMENT LIST

Optical Interposer—100
Interposer Photonic Integrated Circuit (Pic)—105
Optical Transceiver Interface—110
Transceiver Photonic Circuit—115
External Optical Interface—120
Interposer Waveguide—125
Interposer Input/Output (I/O) Channel for Optical Transceiver Interface—130
Interposer Input/Output (I/O) Channel for External Optical Interface—135
Transceiver PIC Input/Output (I/O) Channel—140
Transceiver Waveguide—145
Optical Fiber—150
Optical Fiber Array—155
Planar Lightwave Circuit (PLC)—160
Free Space Optical System—165
External PLC Circuit—170
External Optical Light Path—175
Following reference numbers are used interchangeably for convenience and better understanding of exemplary examples in the various embodiments of the present invention:
Transceiver Photonic Integrated Circuit (PIC)—110

DETAILED DESCRIPTION

The present invention relates to an optical interposer operably configured/adapted to provide for optimal optical coupling (and/or optical connection) between an optical transceiver interface and an external optical interface.

The principles of the present invention and their advantages are best understood by referring to FIG. 1A to FIG. 14.

In the following detailed description of illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1A:
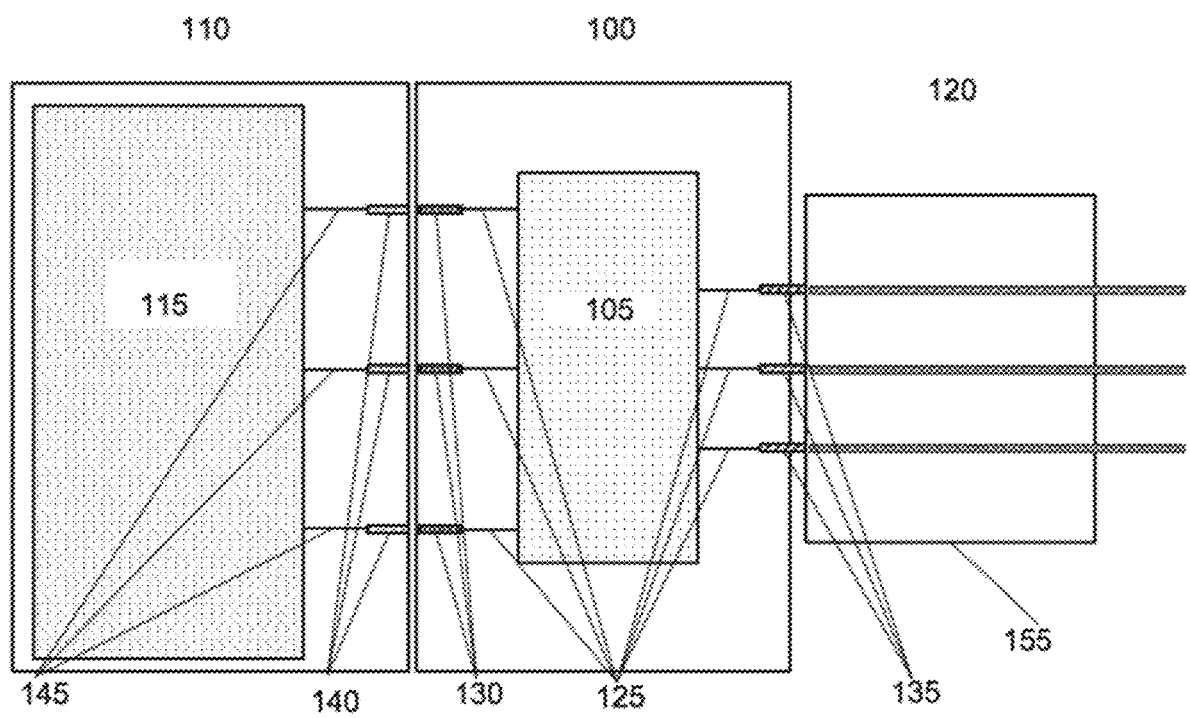
FIG. 1A is a schematic diagram illustrating a top view of an optical interposer in accordance with an embodiment of the present invention.
Figure 1B:
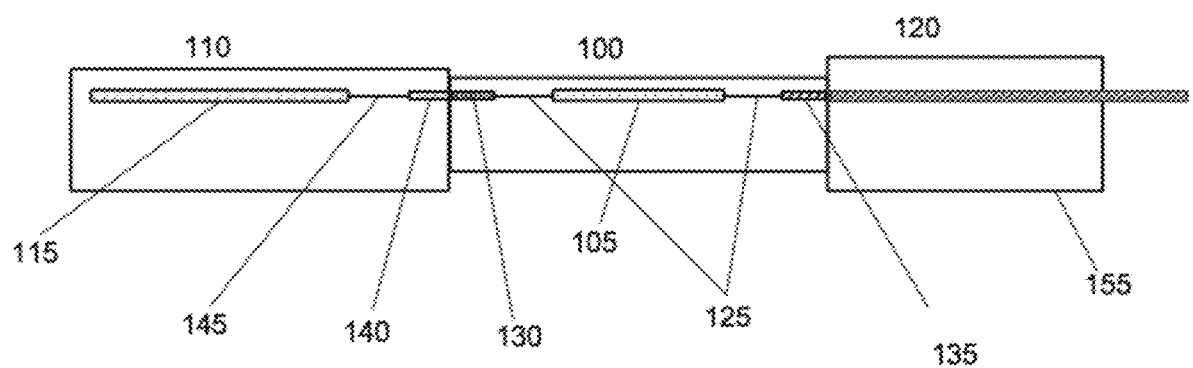
FIG. 1B is a schematic diagram illustrating a side view of the optical interposer in accordance with an embodiment of the present invention.

FIG. 1A and FIG. 1B illustrates a schematic top view and side view of an optical interposer in accordance with one or more embodiments of the present invention. In particular, the optical interposer (100) includes an interposer photonic integrated circuit (PIC) (105), one or more waveguide based optical devices with an interposer waveguide (125) and one or more interposer input/output (I/O) channels (130 and/or 135).

The interposer photonic integrated circuit (PIC) (105) is operably configured/adapted to couple the optical signal between the optical transceiver interface (110) and the external optical interface (120).

The waveguide based optical devices with an interposer waveguide (125) are integrated on a common substrate. In particular, the common substrate is a semiconductor substrate.

The interposer input/output (I/O) channel (130) is operably configured/adapted with the transceiver PIC input/output (I/O) channel (140) of the optical transceiver interface (110). And, the interposer input/output (I/O) channel (135) is also operably configured/adapted with the external optical interface (120).

In accordance with an embodiment of the present invention, the optical transceiver interface (110) is a transceiver photonic integrated circuit (PIC) (110). The transceiver photonic integrated circuit (PIC) (110) further includes transceiver photonic circuit (115), transceiver waveguide (145) and transceiver PIC input/output (I/O) channel (140).

In accordance with an embodiment of the present invention, the external optical interface (120) is anyone of an optical fiber (150), an optical fiber array (155), a planar lightwave circuit (PLC) (160), a free space optical system (165) and alike.

Referring to FIG. 1A and FIG. 1B, the optical interposer (100) includes a transceiver photonic integrated circuit (PIC) (110) and an optical fiber array (155) in the external optical interface (120).

In accordance with an embodiment of the present invention, the optical interposer (100) is operably positioned between the transceiver photonic integrated circuit (PIC) (110) and the external optical interface (120) to provide optimal optical coupling (or optical connection) between the transceiver photonic integrated circuit (PIC) (110) and the external optical interface (120).

In accordance with an embodiment of the present invention, the optical interposer (100) is operably functional as a semiconductor chip to provide a bridge between the transceiver photonic integrated circuit (PIC) (110) and the external optical interface (120). In particular, the bridge provides a specific connection to the external optical interface (120) with different functions. Moreover, the optical interposer (100) acts as a semiconductor chip which is independent from the functional photonic integrated circuit (PIC) assembled as the extension of the transceiver photonic integrated circuit (PIC) (110).

In accordance with an embodiment of the present invention, the optical interposer (100) is operably functional as a mode size convertor for the optimal optical coupling (or optical connection) with the transceiver photonic integrated circuit (PIC) (110). In particular, the optical interposer (100) acts as the mode size converter between the transceiver PIC input/output (I/O) channel (140) and the external optical interface (120) such as an optical fiber (150) as shown in FIG. 1A. Moreover, the waveguide based optical devices have edges for optimal optical coupling (or optical connection) with the transceiver photonic integrated circuit (PIC) (110) and to adjust the mode shape in the waveguide based optical device to output a suitable mode to couple into the external optical interface, typically with a larger optical mode size, respectively.

Figure 2:
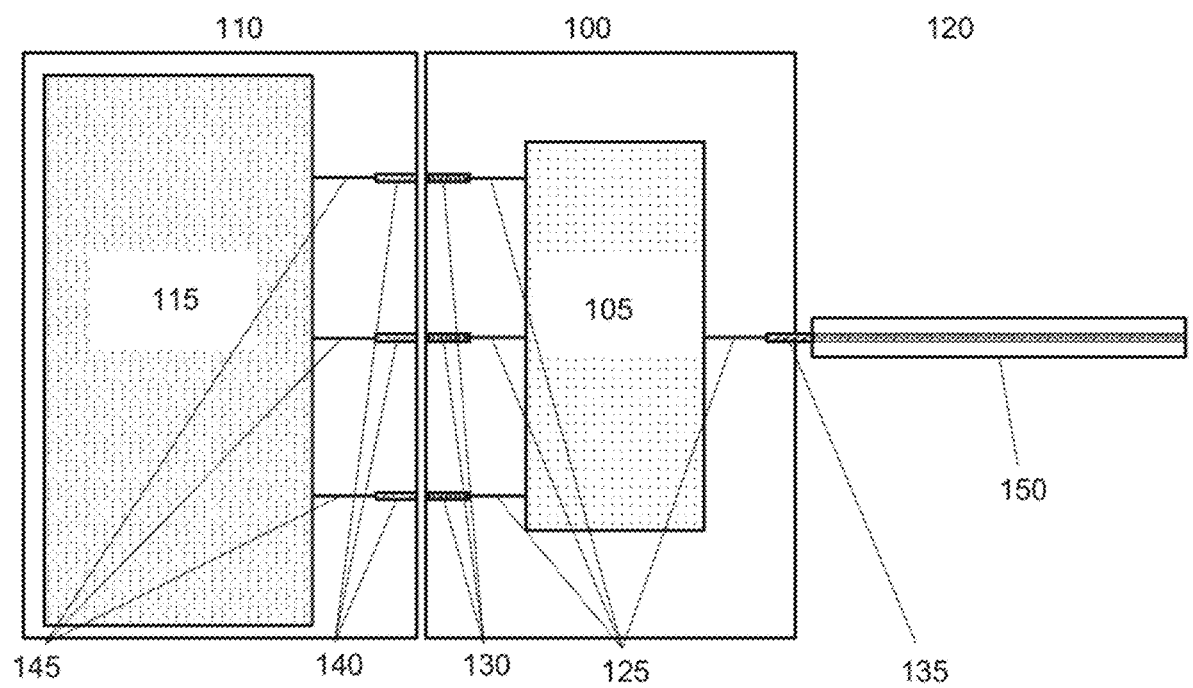
FIG. 2 is a schematic diagram illustrating the optical interposer with an external optical interface in accordance with one embodiment of the present invention.
Figure 3:
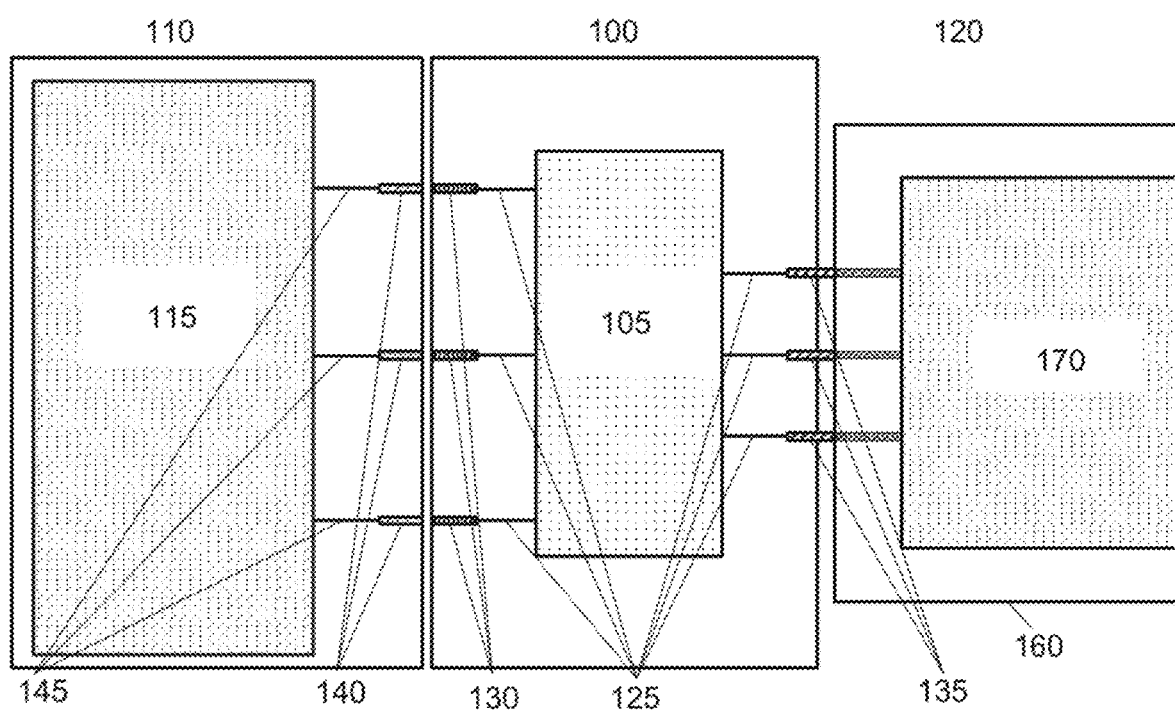
FIG. 3 is a schematic diagram illustrating the optical interposer with an external optical interface in accordance with another embodiment of the present invention.
Figure 4:
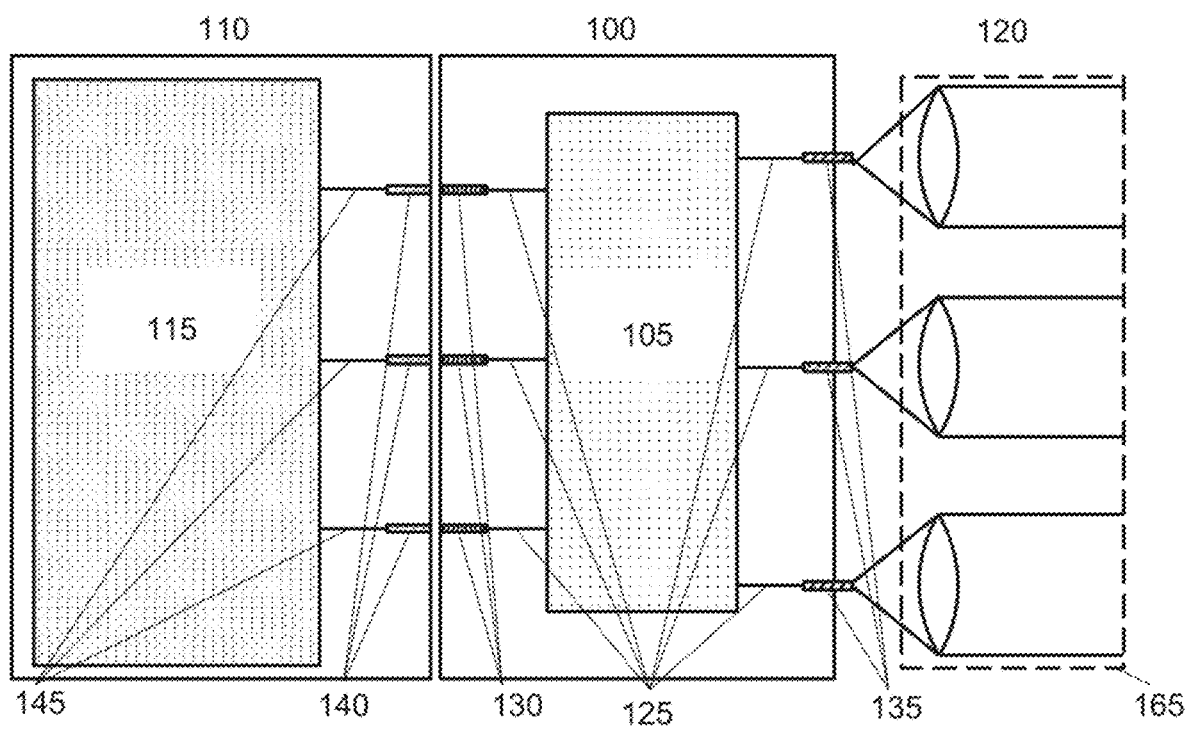
FIG. 4 is a schematic diagram illustrating the optical interposer with an external optical interface in accordance with yet another embodiment of the present invention.

FIG. 2, FIG. 3 and FIG. 4 illustrate a schematic diagram of the optical interposer connected to the external optical interface in accordance with one or more embodiments of the present invention. In particular, the external optical interfaces are optical fiber (150), planar lightwave circuit (PLC) (160) and free space optical system (165), respectively in FIG. 2, FIG. 3 and FIG. 4.

In accordance with an embodiment of the present invention, the optical interposer (100) is operably functional to match a pitch configuration of transceiver photonic integrated circuit (PIC) input/output (I/O) channel (140) and the external optical interface (120) as shown in FIGS. 1A, 2, 3, and 4 to reduce the size of the waveguide based optical device and facilitate multiple channel devices.

Figure 5:
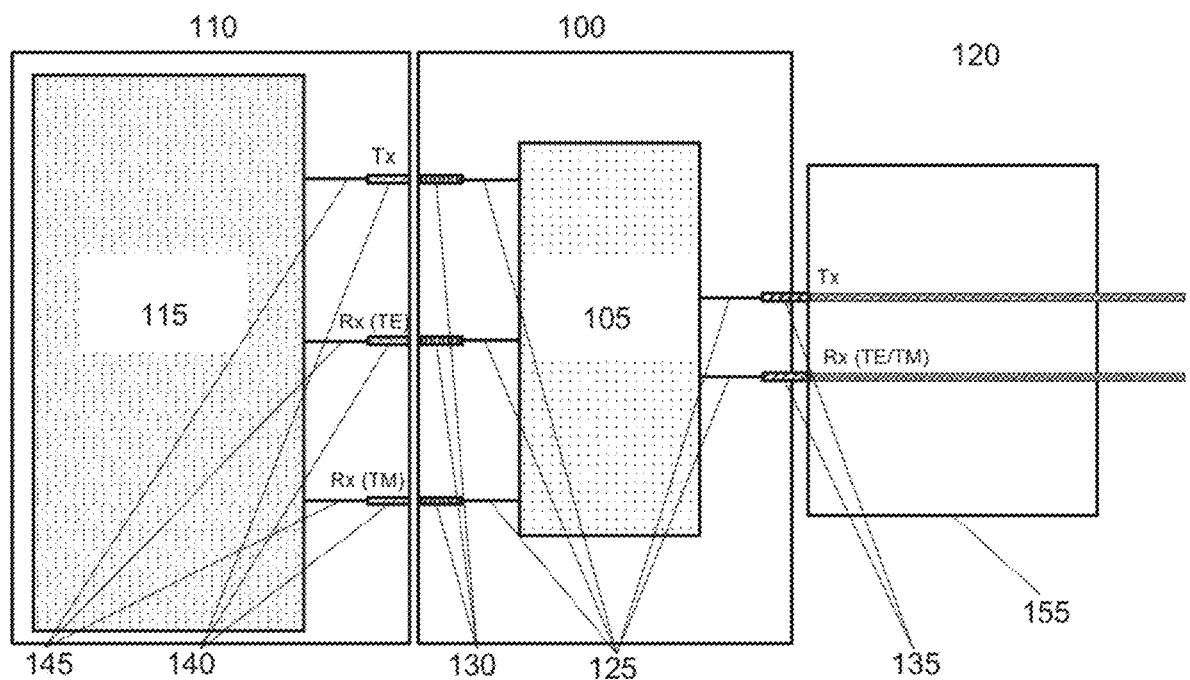
FIG. 5 is a schematic diagram of the optical interposer illustrating Transverse Electric (TE) polarization and Transverse Magnetic (TM) polarization in accordance with one embodiment of the present invention.

FIG. 5 is a schematic diagram of the optical interposer illustrating a transverse electric (TE) polarization and a transverse magnetic (TM) polarization in accordance with one embodiment of the present invention. In particular, the optical interposer (100) selects an input optical signal based on the TE polarization/TM polarization and outputs the TE mode optical signals and TM mode optical signals to different output ports. The optical fiber array (155) has one pair of optical I/O, called Tx/Rx. The optical interposer (100) provides the bridge connecting the transceiver photonic integrated circuit (PIC) (110) and optical fiber array (155) for transmitting the Tx signal from the transceiver photonic integrated circuit (PIC) (110) to optical fiber array (155). Further, for receiving the signal coming from the optical fiber array (155) array, the light is combined with TE and TM modes.

In accordance with an embodiment of the present invention, the optical interposer (100) is operably functional as a polarization splitter. In particular, the optical interposer selects the TE and TM modes and guides towards different ports and couples back to the receiver side of the transceiver photonic integrated circuit (PIC) (110).

In PIC/PLC scenario, TE polarization means electric field of light mode mostly parallel to planar surface and perpendicular to the propagation direction. And, TM polarization means electric field of light mode mostly perpendicular to the planar surface and the propagation direction.

Figure 6:
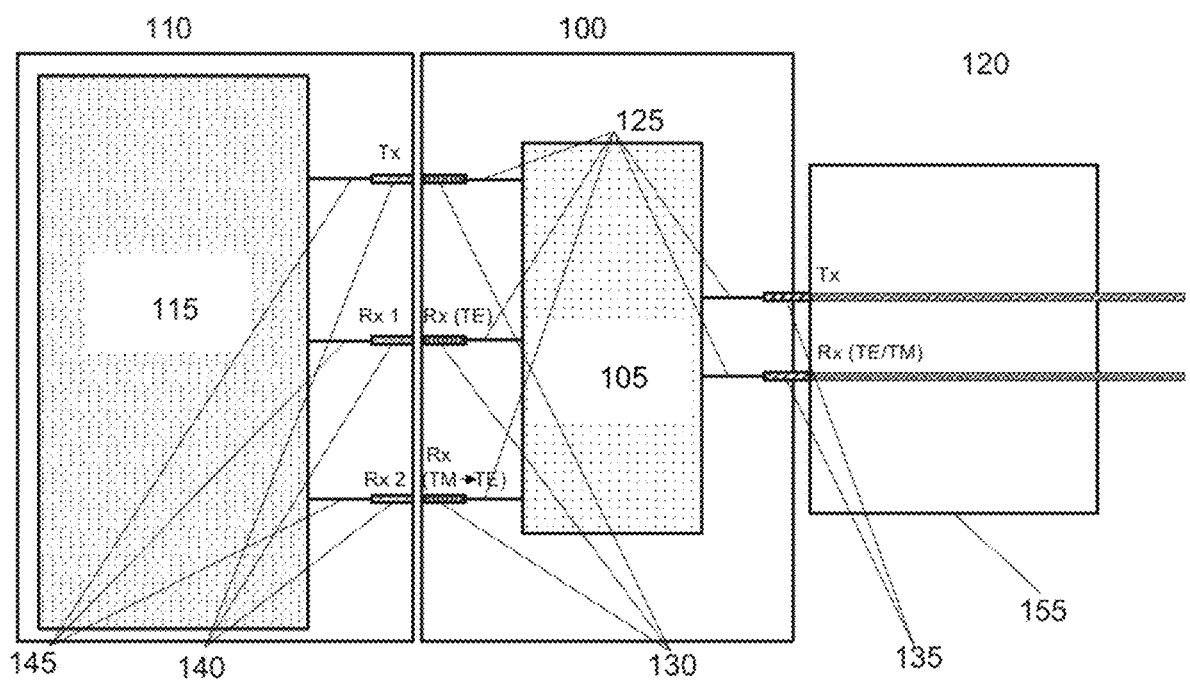
FIG. 6 is a schematic diagram of the optical interposer illustrating Transverse Electric (TE) polarization in accordance with another embodiment of the present invention.

FIG. 6 is a schematic diagram of the optical interposer illustrating the transverse electric (TE) polarization in accordance with another embodiment of the present invention. In particular, the waveguide based optical device on the interposer photonic integrated circuit (PIC) (105) is operably configured/adapted to select the input optical signal based on the TE/TM polarization and further switching the input TM mode optical signal to TE mode optical signal mode. Although, the TE and TM modes are selectively directed towards 2 different ports, however during propagation in the optical interposer (100), the TM mode is rotated to TE mode. Thus, the output ports contain TE optical signal.

Figure 7:
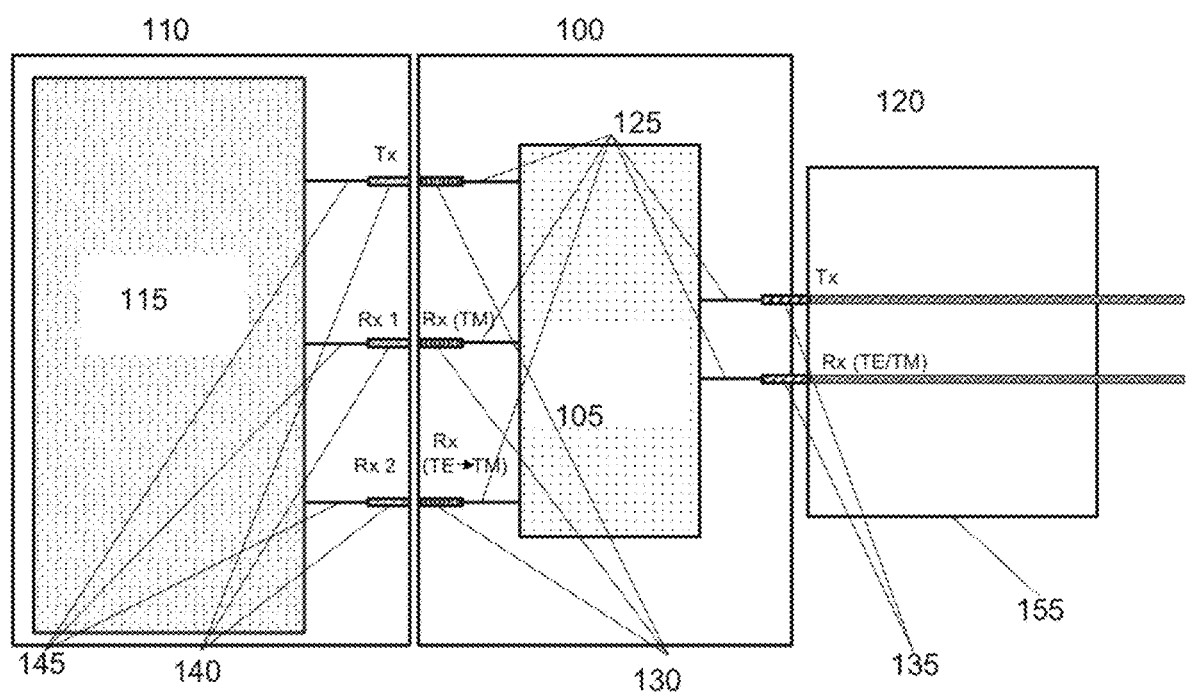
FIG. 7 is a schematic diagram of the optical interposer illustrating Transverse Magnetic (TM) polarization in accordance with yet another embodiment of the present invention.

FIG. 7 is a schematic diagram of the optical interposer illustrating the transverse magnetic (TM) polarization in accordance with yet another embodiment of the present invention. The waveguide based optical device on the interposer photonic integrated circuit (PIC) (105) is operably configured/adapted to select the input optical signal based on the TE/TM polarization and further switching the input TE mode optical signal to TM mode optical signals. Although, the TE and TM modes are selectively directed towards 2 different ports, however during propagation in the optical interposer (100), the TE mode is rotated to TM mode. Thus, the output ports contain TM optical signal.

In accordance with an embodiment of the present invention, the optical interposer (100) is operably functional as a polarization selector.

In accordance with an embodiment of the present invention, the optical interposer (100) is operably functional as a polarization switch.

In accordance with an embodiment of the present invention, the optical interposer (100) is operably functional as a polarization rotator.

In accordance with an embodiment of the present invention, the optical interposer is operably functional as a routing circuit to distribute the pitch.

Figure 8:
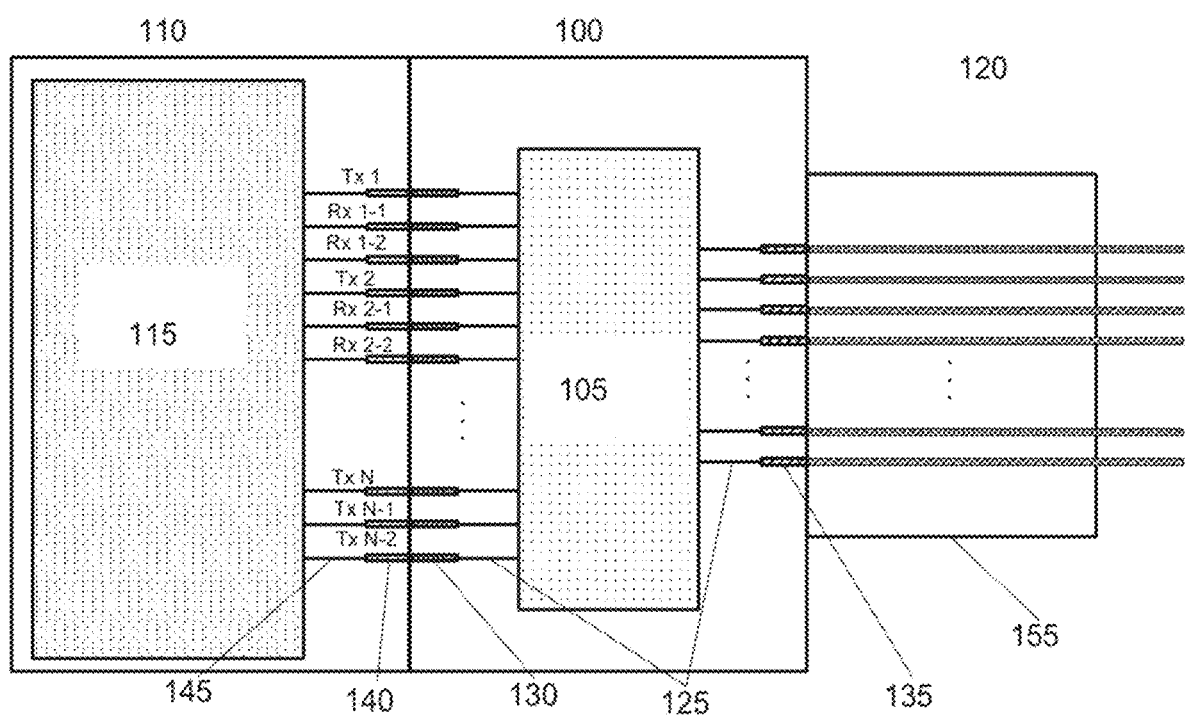
FIG. 8 is a schematic diagram of the interposer photonic integrated circuit (PIC) illustrating coupling of the optical signal between multiple transceiver PIC input/output (I/O) channels and multiple external channels in accordance with an embodiment of the present invention.

FIG. 8 is a schematic diagram of the interposer photonic integrated circuit (PIC) illustrating coupling of the optical signal in accordance with an embodiment of the present invention. In particular, the waveguide based optical device on the optical interposer (100) is operably configured/adapted to couple optical signals between a multiple transceiver PIC input/output (I/O) channels and multiple external channels. Moreover, the multiple channel coupling provides a routing path for the photonic integrated circuit to make the output channels with designable pitch for the coupling to the external optical interface.

Figure 9:
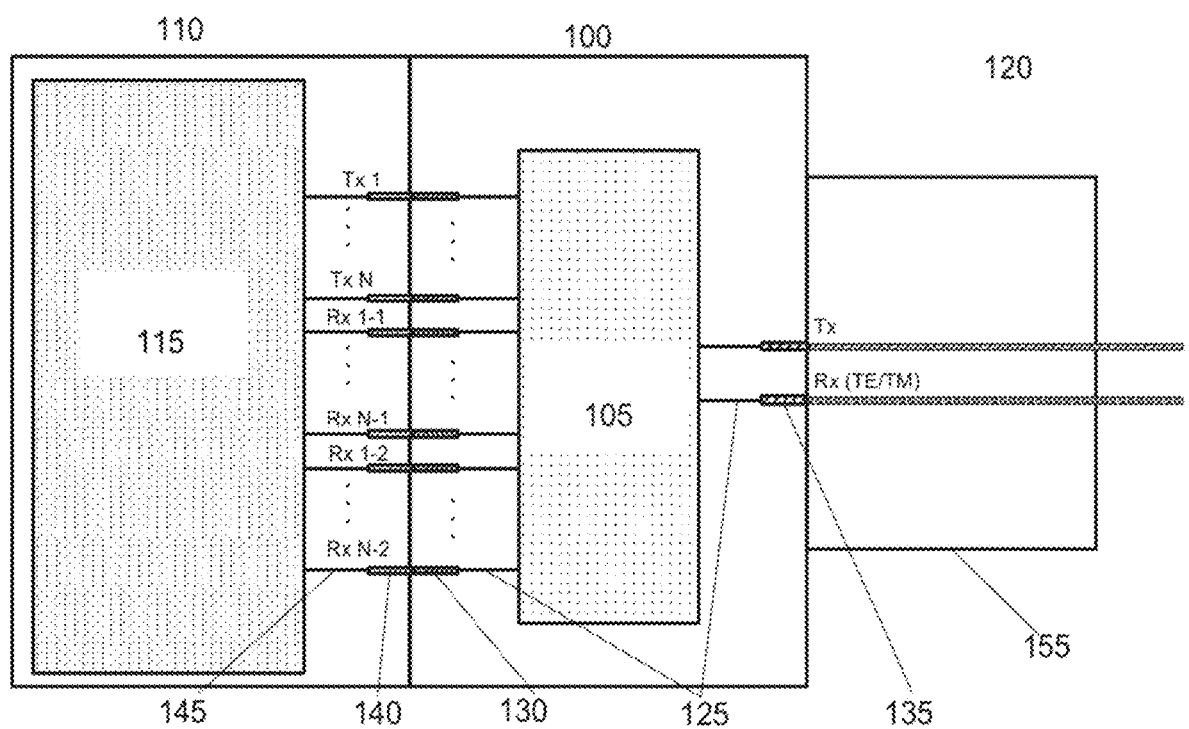
FIG. 9 is a schematic diagram illustrating the optical interposer for multiplexing and/or demultiplexing optical signals in accordance with an embodiment of the present invention.

FIG. 9 is a schematic diagram illustrating the optical interposer for multiplexing and/or demultiplexing optical signals in accordance with an embodiment of the present invention.

In accordance with an embodiment of the present invention, on the transmitter side, the optical interposer (100) accepts multiple optical signals from the transceiver photonic integrated circuit (PIC) (110) and multiplexes the multiple optical signals into a single signal and outputs the single signal to the external optical interface (120).

In accordance with an embodiment of the present invention, the optical interposer receives a single signal from the external optical interface (120) and demultiplex it to several signals and guide them to the transceiver photonic integrated circuit (PIC) (110). Thus, reducing the number of input/output (I/O) channels in the external optical interface (120).

In accordance with an embodiment of the present invention, the optical interposer (100) is operably functional as an optical multiplexer (MUX) and/or an optical demultiplexer (deMUX) to allow the fabrication of passive devices with a lower phase error, lower internal propagation loss and higher fabrication tolerance and lower thermal sensitivity.

Figure 10:
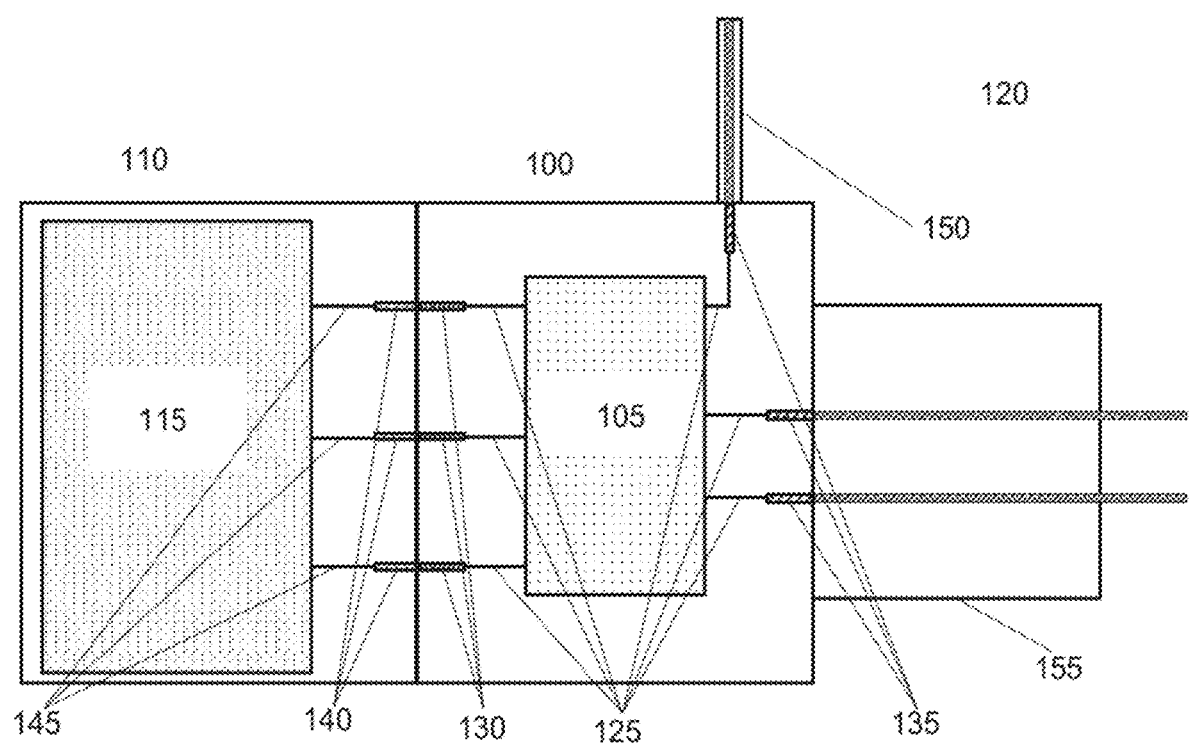
FIG. 10 illustrates a schematic diagram of the optical interposer connected to multiple external optical interfaces in accordance with an embodiment of the present invention.

FIG. 10 illustrates a schematic diagram of the optical interposer further includes multiple external optical interfaces in accordance with an embodiment of the present invention. In particular, the multiple external optical interfaces are not limited to one edge of the optical interposer.

In accordance with an embodiment of the present invention, the multiple channels serve one of the above-mentioned functionalities such as but not limited to, mode size convertor, light splitter/combiner, wavelength filter, polarization splitter, polarization rotator, and light multiplexer/demultiplexer.

Figure 11:
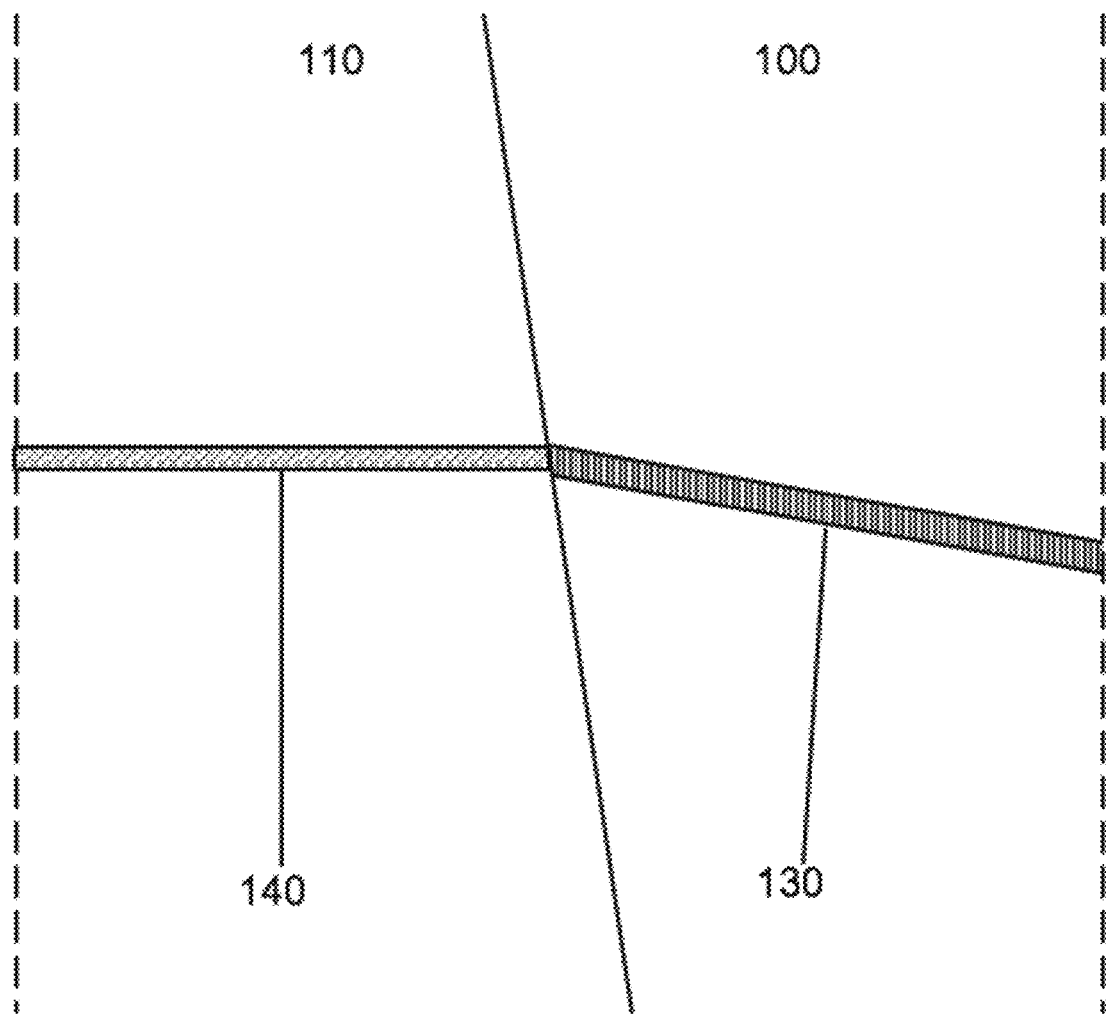
FIG. 11 illustrates an interposer interface of the optical interposer to the transceiver photonic integrated circuit (PIC) in accordance with one embodiment of the present invention.
Figure 12:
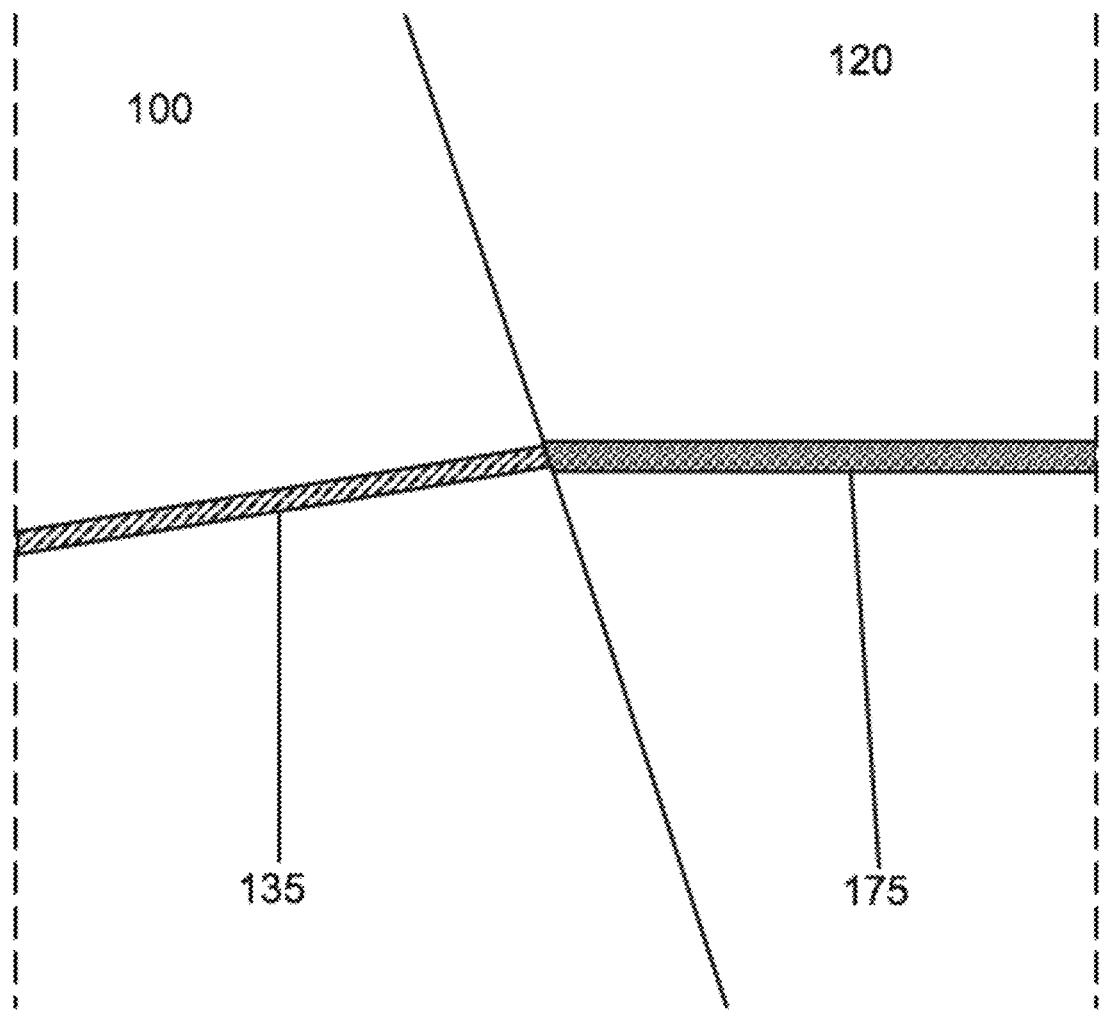
FIG. 12 illustrates the angled interposer interface of the optical interposer to the external optical interface in accordance with another embodiment of the present invention.

FIG. 11 and FIG. 12 illustrate an interposer interface of the optical interposer with respect to the transceiver photonic integrated circuit (PIC) (110) and the external optical interface (120) in accordance with one or more embodiments of the present invention. In particular, the interposer interface is an angled interposer interface. Moreover, the angled interposer interface is polished laterally at an angle to minimize back reflection.

Figure 13:
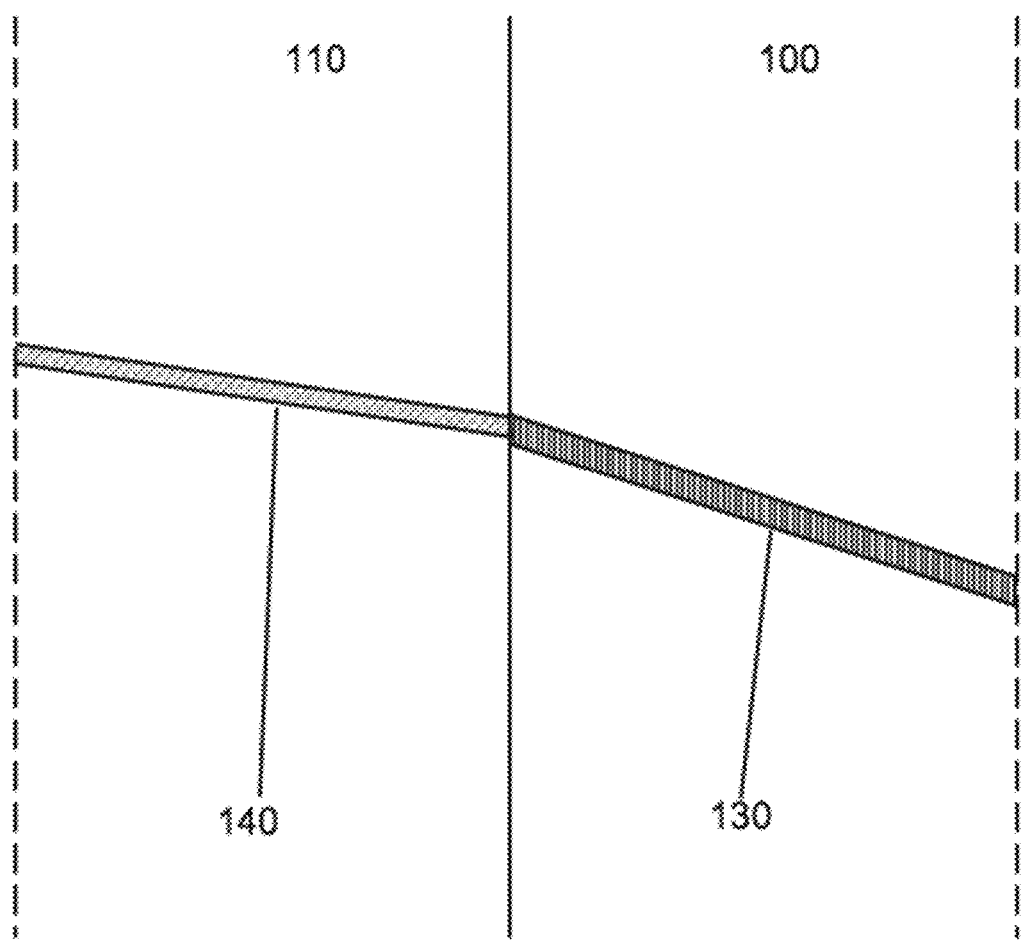
FIG. 13 illustrates an angled waveguide on the optical interposer interface to the transceiver photonic integrated circuit (PIC) in accordance with one embodiment of the present invention.
Figure 14:
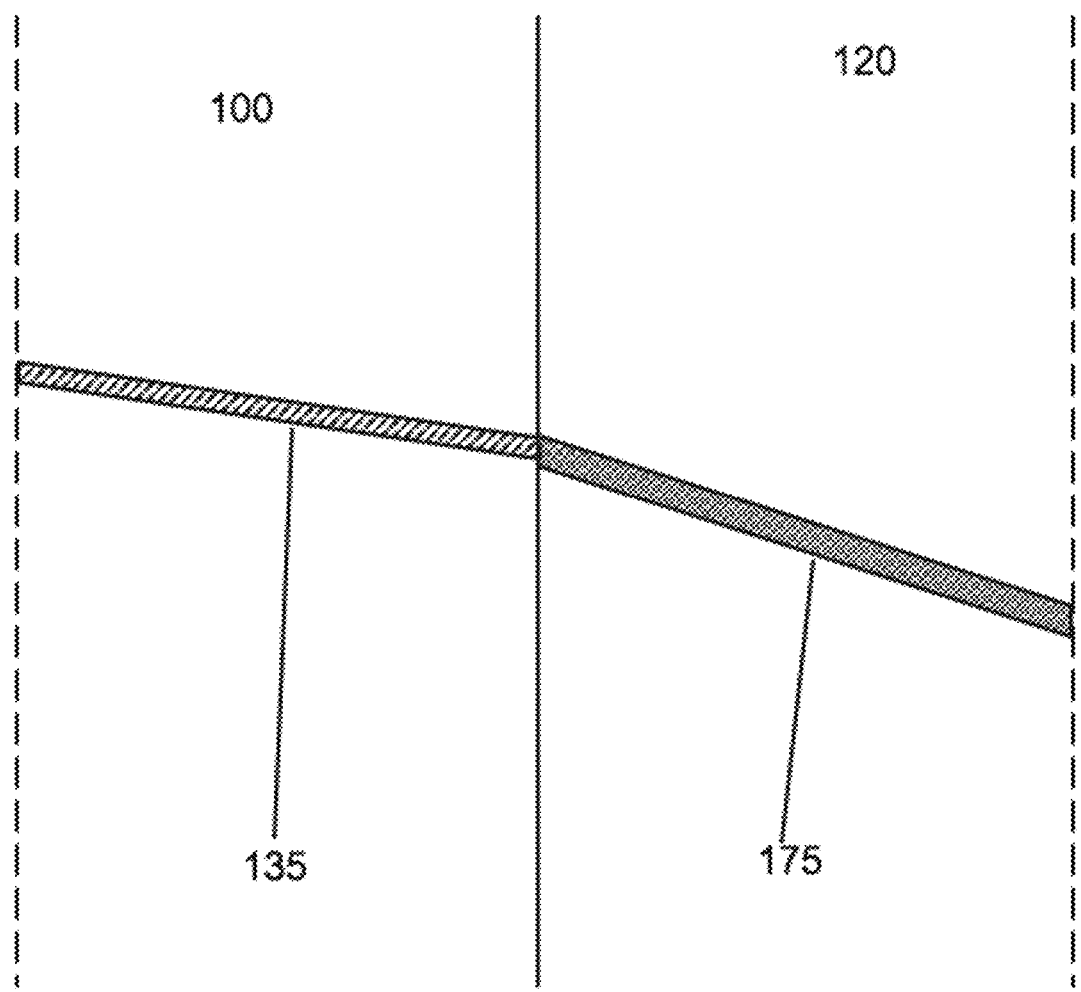
FIG. 14 illustrates an angled waveguide on the optical interposer interface to the external optical interface in accordance with another embodiment of the present invention.

FIG. 13 and FIG. 14 illustrate an interposer interface to the transceiver photonic integrated circuit (PIC) (110) and the external optical interface (120) in accordance with one or more embodiments of the present invention. In particular, the interposer interface is not made angled deliberately, the waveguide is adjustably tilted at a specific angel to achieve the non angled interface and achieve the same effect of minimizing the back reflection.

In accordance with an embodiment of the present invention, the refractive index value of an interposer waveguide is between the transceiver photonic integrated circuit waveguide value and the external optical interface waveguide value (or light path in free space).

Thus, the embodiments of the present invention provide the optical interposer for optimal coupling (and/or optical connection) of optical signals between optical transceiver interface and external optical interface. In particular, the optical interposer has a higher alignment tolerance, lower waveguide propagation loss, higher performance, lower internal propagation loss and higher fabrication tolerance.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It is to be understood that the terms so used are interchangeable under appropriate circumstances and embodiments of the invention are capable of operating according to the present invention in other sequences, or in orientations different from the one(s) described or illustrated above.

What is claimed is:

1. An optical interposer for providing an optimal optical coupling between an optical transceiver interface and an external optical interface, the optical interposer comprising:
   an interposer photonic integrated circuit (PIC) operably configured to couple an optical signal between the optical transceiver interface and the external optical interface;
   one or more waveguide based optical devices operably integrated on a common substrate; and
   a plurality of interposer input/output (I/O) channels operably configured with a transceiver PIC input/output (I/O) channel of the optical transceiver interface and the external optical interface;

wherein a refractive index value of an interposer waveguide is between a transceiver photonic integrated circuit waveguide value and an external optical interface waveguide value.

2. The optical interposer as claimed in claim 1, wherein the optical transceiver interface is a transceiver photonic integrated circuit (PIC).

3. The optical interposer as claimed in claim 1, wherein the common substrate is a semiconductor substrate.

4. The optical interposer as claimed in claim 1, wherein the external optical interface is anyone of an optical fiber, an optical fiber array, a planar lightwave circuit (PLC), and a free-space optical system.

5. The optical interposer as claimed in claim 2, wherein the optical interposer is positioned between the transceiver photonic integrated circuit (PIC) and the external optical interface.

6. The optical interposer as claimed in claim 1, wherein the optical interposer is operably functional as a semiconductor chip.

7. The optical interposer as claimed in claim 1, wherein the optical interposer is operably functional as a mode size converter between the transceiver PIC input/output (I/O) channel and the external optical interface.

8. The optical interposer as claimed in claim 1, wherein the optical interposer is operably functional as a polarization selector and/or a polarization switch.

9. The optical interposer as claimed in claim 1, wherein the optical interposer is operably functional as a polarization rotator.

10. The optical interposer as claimed in claim 1, wherein the optical interposer is operably functional as a routing circuit to distribute a pitch.

11. The optical interposer as claimed in claim 1, wherein the optical interposer is operably functional as a polarization splitter.

12. The optical interposer as claimed in claim 1, wherein the optical interposer is operably functional as an optical multiplexer (MUX) and/or an optical demultiplexer (deMUX).

13. The optical interposer as claimed in claim 12, wherein the optical multiplexer (MUX) is operably configured to accepts a plurality of optical signals from a transceiver photonic integrated circuit (PIC), multiplexes the plurality of optical signals into a single signal.

14. The optical interposer as claimed in claim 12, wherein the optical demultiplexer (deMUX) receives a single signal from the external optical interface and demultiplex the single signal into a plurality of signals.

15. The optical interposer as claimed in claim 1, wherein the optical interposer further comprises an angled interposer interface.

16. The optical interposer as claimed in claim 1, wherein the optical interposer further comprises a plurality of external optical interface.

17. The optical interposer as claimed in claim 1, wherein the optical interposer is operably configured to provide the optimal optical coupling with a plurality of transceiver PIC input/output (I/O) channels and a plurality of external optical channels.

18. An optical interposer for providing an optimal optical coupling between an optical transceiver interface and an external optical interface, the optical interposer comprising:

an interposer photonic integrated circuit (PIC) operably configured to couple an optical signal between the optical transceiver interface and the external optical interface;

one or more waveguide based optical devices operably integrated on a common substrate; and a plurality of interposer input/output (I/O) channels operably configured with a transceiver PIC input/output (I/O) channel of the optical transceiver interface and the external optical interface, wherein the optical interposer further comprises an angled interposer waveguide.

* * * * *